(12) United States Patent
Mori

(10) Patent No.: US 9,903,464 B2
(45) Date of Patent: Feb. 27, 2018

(54) DIFFERENTIAL DEVICE

(71) Applicant: MUSASHI SEIMITSU INDUSTRY CO., LTD., Toyohashi-shi, Aichi (JP)

(72) Inventor: Hiroyuki Mori, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 41 days.

(21) Appl. No.: 14/887,740

(22) Filed: Oct. 20, 2015

(65) Prior Publication Data
US 2016/0116052 A1    Apr. 28, 2016

(30) Foreign Application Priority Data

Oct. 22, 2014   (JP) .................................. 2014-215608

(51) Int. Cl.
*F16H 57/04*    (2010.01)
*F16H 48/08*    (2006.01)

(52) U.S. Cl.
CPC ..... *F16H 57/0427* (2013.01); *F16H 57/0483* (2013.01); *F16H 48/08* (2013.01); *F16H 57/0423* (2013.01)

(58) Field of Classification Search
CPC ........... F16H 48/08; F16H 2057/02091; F16H 57/0423; F16H 57/0421; F16H 57/0483; F16H 57/0427
See application file for complete search history.

(56) References Cited

U.S. PATENT DOCUMENTS

| 3,905,089 A * | 9/1975 | Osenbaugh | B60K 17/16 29/434 |
| 6,966,863 B2 * | 11/2005 | Teraoka | F16H 48/24 475/154 |
| 7,056,255 B2 * | 6/2006 | Hay | F16H 48/08 475/220 |
| 7,320,659 B2 * | 1/2008 | Pritchard | F16H 48/08 475/220 |
| 7,445,088 B2 * | 11/2008 | Watanabe | F16H 57/0427 184/13.1 |

(Continued)

FOREIGN PATENT DOCUMENTS

| DE | 10 2007 040479 A1 | 3/2009 |
| JP | 2008-089147 A | 4/2008 |
| JP | 4803871 B2 | 10/2011 |

*Primary Examiner* — Derek D Knight
*Assistant Examiner* — David R Morris
(74) *Attorney, Agent, or Firm* — Carrier Blackman & Associates, P.C.; William D. Blackman; Joseph P. Carrier

(57) ABSTRACT

A differential device distributively transmitting rotational force of an input member rotatable together with a pinion support portion to paired output shafts includes: paired side gears respectively having an outer peripheral portion including a toothing portion meshing with a pinion and connected to the output shafts; and a cover portion covering an outside of at least one side gear and rotating integrally with the input member, even under severe driving conditions, preventing seizure in the portions and degradation of lubricant oil is suppressed. At least one cover portion includes an oil retaining portion covering a back surface of the one side gear in a first predetermined area including an area overlapping the pinion and a lightening portion exposing the back surface in a second predetermined area without overlapping the pinion, as seen in a side view from axially outside of the output shafts.

16 Claims, 10 Drawing Sheets

(56) References Cited

U.S. PATENT DOCUMENTS

| | | | | |
|---|---|---|---|---|
| 7,695,392 | B2* | 4/2010 | Isken, II | F16H 48/08 475/230 |
| 7,819,040 | B2* | 10/2010 | Meier | B21D 53/90 74/607 |
| 7,976,421 | B2* | 7/2011 | Nakajima | F16H 48/08 475/160 |
| 8,544,174 | B2* | 10/2013 | Isken, II | B21D 22/16 29/893.1 |
| 9,115,796 | B1* | 8/2015 | Yanase | F16H 48/40 |
| 9,261,183 | B2* | 2/2016 | Yanase | F16H 48/38 |
| 9,377,095 | B2* | 6/2016 | Yanase | F16H 48/40 |
| 2006/0287155 | A1* | 12/2006 | Nakajima | F16H 48/08 475/230 |
| 2015/0276043 | A1* | 10/2015 | Girardot | F16H 57/0423 475/160 |
| 2016/0116045 | A1* | 4/2016 | Mori | F16H 48/08 475/220 |
| 2016/0116047 | A1* | 4/2016 | Nishimura | F16H 48/08 475/230 |
| 2016/0123449 | A1* | 5/2016 | Nishimura | F16H 48/08 475/230 |
| 2016/0138702 | A1* | 5/2016 | Yanase | F16H 57/0431 475/160 |
| 2016/0160983 | A1* | 6/2016 | Yanase | F16H 48/40 475/230 |
| 2016/0169360 | A1* | 6/2016 | Yanase | F16H 48/40 475/230 |
| 2016/0169370 | A1* | 6/2016 | Mori | F16H 57/0483 475/160 |
| 2016/0290485 | A1* | 10/2016 | Mori | F16H 57/0483 |
| 2016/0290486 | A1* | 10/2016 | Nishimura | F16H 57/0483 |
| 2016/0290487 | A1* | 10/2016 | Mori | F16H 57/0483 |

* cited by examiner

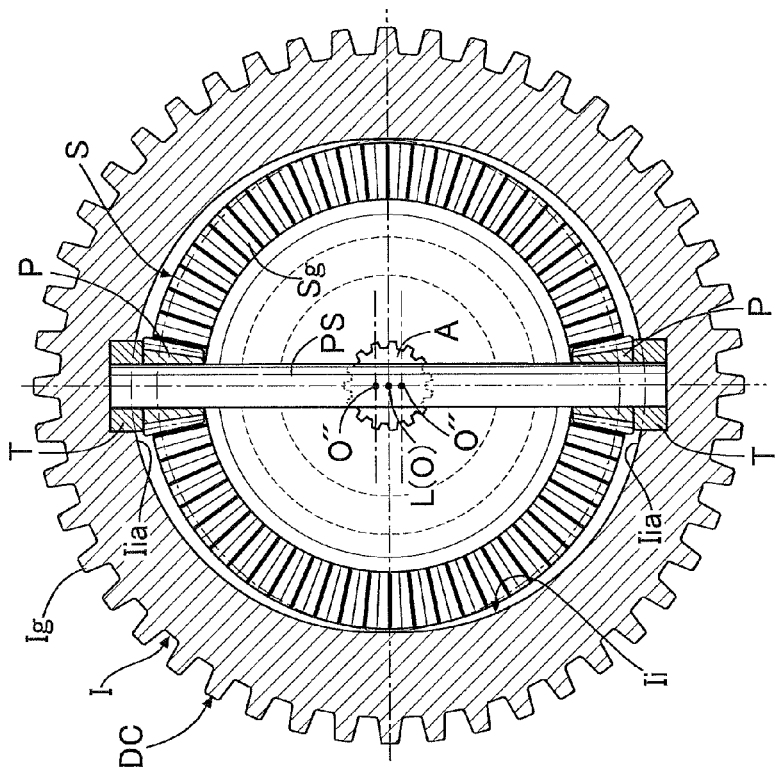
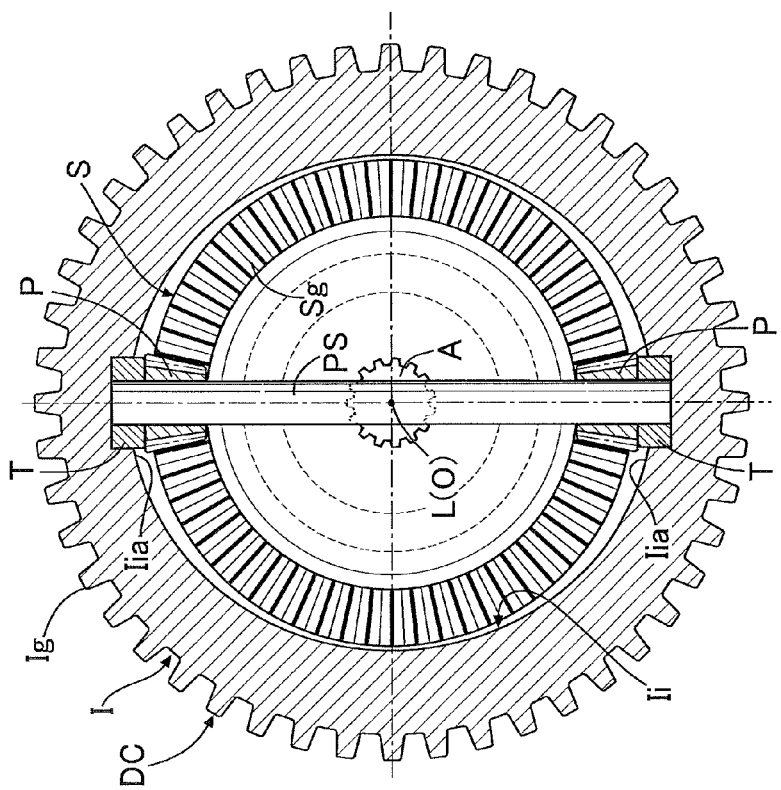

DIFFERENTIAL DEVICE

BACKGROUND OF THE INVENTION

Field of the Invention

The present invention relates to an improvement of a differential device which distributively transmits rotational force of an input member to a pair of mutually-independent output shafts, the input member retaining a pinion support portion that supports a pinion, and being rotatable together with the pinion support portion. Particularly, the present invention relates to an improvement of the differential device that includes: a pair of side gears each having an outer peripheral portion which includes an annular toothing portion in mesh with the pinion, and connected to the pair of output shafts, respectively; and a cover portion covering an outside of at least one side gear, and rotating integrally with the input member.

Description of the Related Art

In some of differential devices, in order to enhance lubricity on slide contact portions of pinions and an input member, an inner peripheral surface of the input member has been conventionally provided with shallow and narrow oil grooves formed along a peripheral direction of the input member. Such differential devices have been made publicly known as described in Japanese Patent No. 4803871.

However, an oil groove structure of the conventional differential device cannot efficiently collect and reserve a large amount of lubricant oil around the pinions. For this reason, particularly under severe driving conditions such as high-speed rotation of the pinions, there may be a shortage of the lubricant oil supply to sliding portions of the pinions and meshing portions of the pinions and the side gears.

In this case, if back surfaces of the side gears are entirely covered with cover portions from outside of the side gears and the lubricant oil is confined in tightly-sealed spaces surrounded by the cover portions and the input member, the lubricant oil is always supplied to the pinions and their vicinities, and the lubricity thereof is secured. On the other hand, since a certain amount of lubricant oil is confined in the tightly-sealed spaces and no lightening portions are formed in the cover portions, there may occur undesirable things such as: resultant increase in the overall weight of the differential device; easy degradation of the lubricant oil because the lubricant oil in the tightly-sealed spaces is not sufficiently exchanged or cooled; and the like.

SUMMARY OF THE INVENTION

The present invention has been made with the foregoing situation taken into consideration. An object of the present invention is to provide the differential device which can solve the above-discussed problems.

In order to achieve the object, a differential device according to the present invention, distributively transmits rotational force of an input member to a pair of output shafts, the input member retaining a pinion support portion that supports a pinion, and being rotatable together with the pinion support portion, wherein the differential device comprises: a pair of side gears each having an outer peripheral portion which includes an annular toothing portion in mesh with the pinion, and connected to the pair of output shafts, respectively; and a cover portion covering an outside of at least one side gear of the side gears, and rotating integrally with the input member, wherein the cover portion includes an oil retaining portion covering an axially outer surface (back surface) of the at least one side gear in a first predetermined area which includes an area overlapping the pinion as seen in a side view from outside in an axial direction of the output shafts, and a lightening portion (also referred to as a "weight-reducing portion" or "cutout portion"), exposing the axially outer surface of the at least one side gear in a second predetermined area without overlapping the pinion as seen in the side view. (This is a first characteristic of the present invention).

According to the first characteristic, at least one cover portion adjacent to an outside of at least one side gear includes the oil retaining portion covering the back surface of the side gear in the first predetermined area which includes the area overlapping the pinion as seen in the side view from outside in the axial direction of the output shafts. This makes it possible for lubricant oil, which tends to move outward in the radial direction of the input member due to centrifugal force produced by rotation of the input member, to be easily retained around the pinion and its vicinity. Accordingly, even under severe driving conditions such as high-speed rotation of the pinion, and the like, the lubricant oil can be sufficiently supplied to sliding portions of the pinion and meshing portions of the pinion and the side gears. For this reason, seizure in the sliding portions and the meshing portions can be effectively prevented. In addition, at least one cover portion includes the lightening portion exposing the back surface of the side gear in the second predetermined area without overlapping the pinion as seen in the side view. This makes it possible to distribute the lubricant oil to inside and outside of the input member via the lightening portion. Accordingly, the lubricant oil is appropriately exchanged and cooled, and is effectively prevented from degradation. Furthermore, a large amount of lubricant oil need not be confined inside the input member, and the cover portion itself is reduced in weight by an amount of the lightening portion thus formed. These can contribute to reduction in the weight of the differential device as a whole.

In the differential device according to the present invention, preferably, the at least one cover portion is connected to the input member at the oil retaining portion. (This is a second characteristic of the present invention).

According to the second characteristic, the cover portion is connected to the input member at the oil retaining portion. This makes it easier for the lubricant oil, which tends to move outward in the radial direction of the input member due to the centrifugal force produced by rotation of the input member, to stay in the space covered by the oil retaining portion and the input member, and accordingly makes it possible to retain the lubricant oil more easily around the pinions and their vicinities.

In the differential device according to the present invention, preferably, the pair of side gears each integrally include a shaft portion connected to the corresponding one of the pair of output shafts, and the at least one cover portion includes a boss portion concentrically surrounding the shaft portion of the side gear, and a connecting arm portion separated from the oil retaining portion in a peripheral direction of the input member, and extending in a radial direction of the input member to connect the boss portion and the input member. (This is a third characteristic of the present invention).

According to the third characteristic, the side gears each integrally include a shaft portion connected to the corresponding one of the output shafts; and the cover portion having the oil retaining portion includes the boss portion concentrically surrounding the shaft portion of the side gear and a connecting arm portion separated from the oil retaining portion in the peripheral direction of the input member and extending in the radial direction of the input member to connect the boss portion and the input member. These make it possible to increase: connecting strength with which the cover portion is connected to the input member; rigidity strength of the cover portion itself which supports the back surface of the side gear; and support rigidity with which the cover portion supports the side gear.

In the differential device according to the present invention, preferably, the at least one cover portion includes an oil guiding inclined surface located in a peripheral edge portion of the lightening portion, the oil guiding inclined surface being capable of guiding flow of lubricant oil into an inside of the input member during rotation of the input member. (This is a fourth characteristic of the present invention).

According to the fourth characteristic, the cover portion includes an oil guiding inclined surface which is located in the peripheral edge portion of the lightening portion and is able to guide flow of the lubricant oil into the inside of the input member during rotation of the input member. This makes it possible to cause the lubricant oil to flow smoothly from the outside to the inside of the cover portion, and to further enhance the lubricating effect.

The above and other objects, characteristics and advantages of the present invention will be clear from detailed descriptions of the preferred embodiments which will be provided below while referring to the attached drawings.

BRIEF DESCRIPTION OF THE DRAWINGS

FIGS. 3A and 3B show modified embodiments of an input member of the differential device, FIG. 3A shows the input member having an inner peripheral surface which is formed by joining two arcs with the same diameter, and FIG. 3B shows the input member having an inner peripheral surface with an elliptic shape.

FIG. 5A shows a modified embodiment in which a washer retaining groove is provided to the cover portion, FIG. 5B shows a modified embodiment in which the washer retaining groove is provided to a back surface of a toothing portion of a side gear, FIG. 5C shows a modified embodiment in which the washer retaining groove is omitted by positioning and retaining a washer by using an overhanging portion of an inner side surface of the cover portion, and FIG. 5D shows a modified embodiment in which an intermediate wall portion of the side gear is disposed closer to a pinion shaft side by decreasing a diameter of an intermediate portion of the pinion shaft.

FIG. 8A shows a relationship between a pinion shaft diameter and a load point length of a pinion, FIG. 8B shows a relationship between a gear ratio of the side gear and the pinion, and a pitch cone distance of the pinion, and FIG. 8C shows a relationship between the gear ratio and a width in an axial direction of the differential device.

DESCRIPTION OF THE PREFERRED EMBODIMENTS

Embodiments of the present invention will be described based on the drawings.

Figure 1:
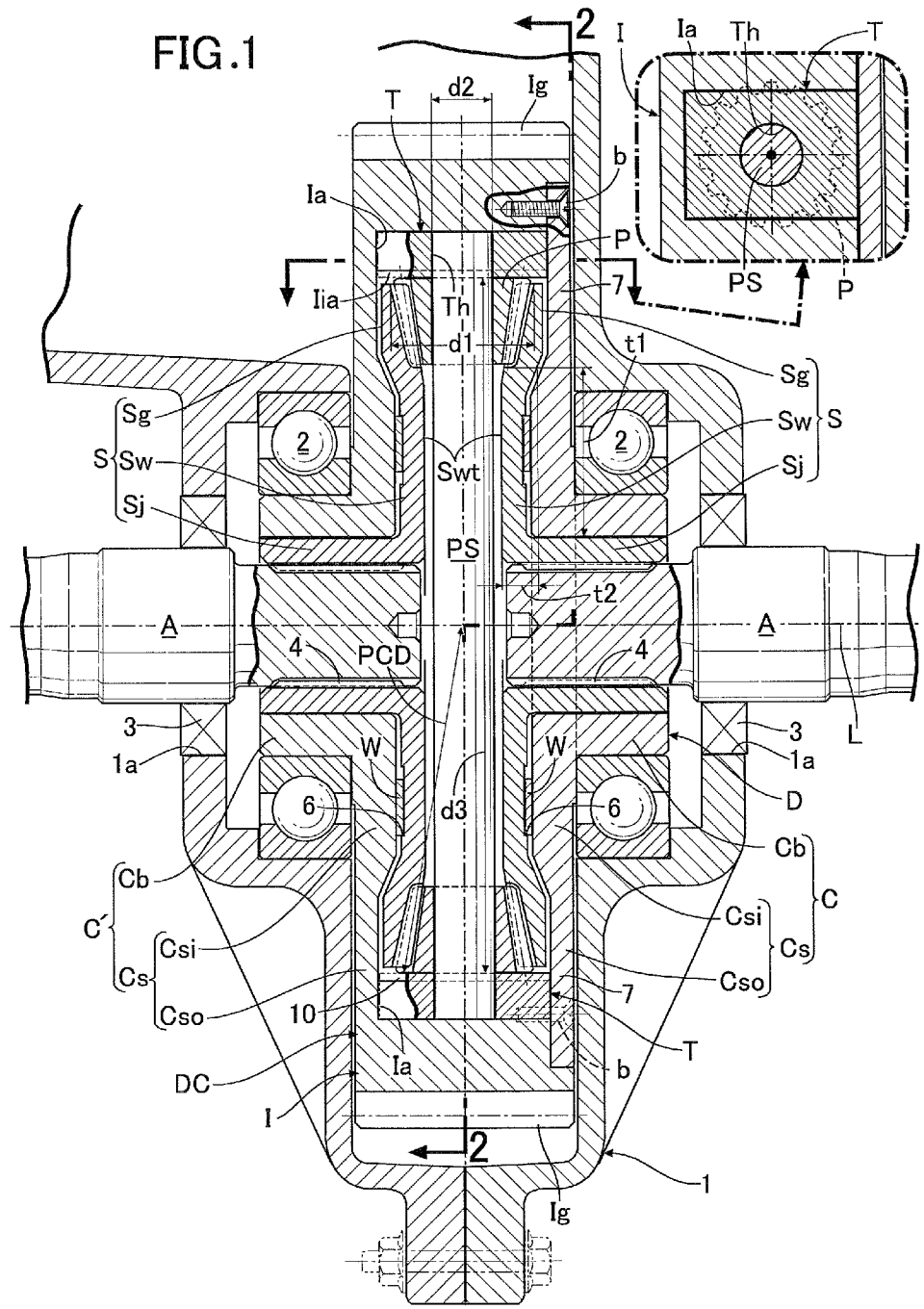
FIG. 1 is a longitudinal sectional view of a differential device and its vicinity of an embodiment of the present invention (a sectional view taken along a 1-1 line in FIG. 2).
Figure 2:
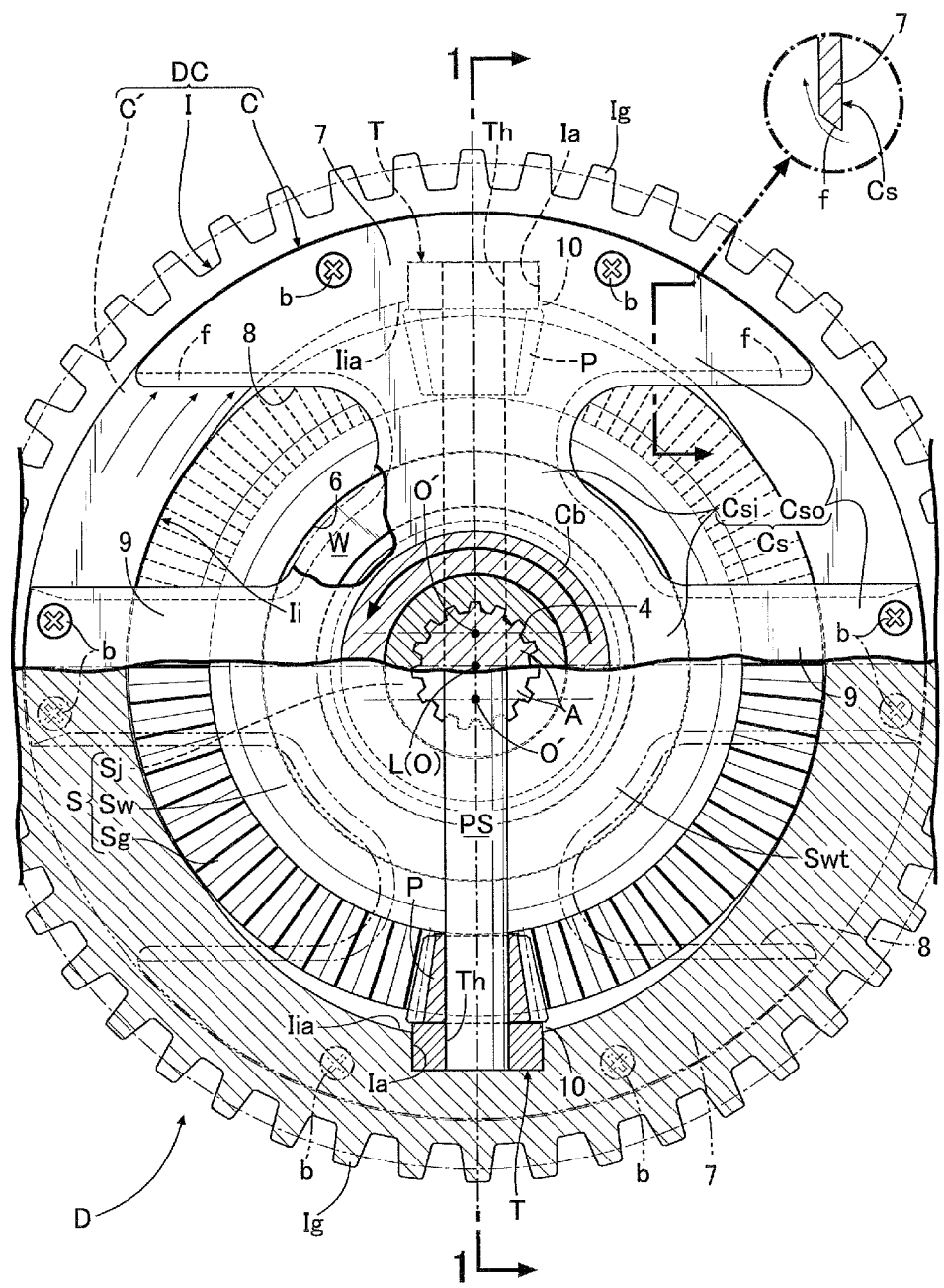
FIG. 2 is a partially cutaway side view of the differential device (a sectional view taken along a 2-2 line in FIG. 1).

To begin with, in FIGS. 1 and 2, a differential device D drives a pair of left and right axles while allowing differential rotation thereof, by distributively transmitting rotational driving force, which is transmitted from an engine (not illustrated) mounted on an automobile, to a pair of left and right output shafts A continuous to the left and right axles. The differential device D is housed and supported, for example, inside a transmission case 1 fixed to the center of a rear portion of a vehicle body.

The differential device D includes: multiple pinions P; a pinion shaft PS as a pinion support portion which rotatably supports the pinions P; an input member I having a short cylindrical shape and supporting the pinion shaft PS so as to be capable of rotating together with the pinion shaft PS; a pair of left and right side gears S in mesh with the pinions P from both the left and right sides, and connected respectively to the pair of left and right output shafts A; and a pair of left and right cover portions C, C' covering outer sides of the respective side gears S, and rotating integrally with the input member I. A differential case DC is formed from the input member I and the cover portions C, C'.

Incidentally, the embodiment shows the differential device D which includes two pinions P, and whose pinion shaft PS as the pinion support portion is formed in a linear rod shape extending along one diameter line of the input member I with the two pinions P respectively supported by both end portions of the pinion shaft PS. Instead, the differential device D may include three or more pinions P. In this case, the pinion shaft PS is formed in a shape of crossing rods such that rods extend radially from a rotation axis L of the input member I in three or more directions corresponding to the three or more pinions P (for example, in a shape of a cross when the differential device D includes four pinions P), and tip end portions of the extending rods support the pinions P, respectively.

In addition, the pinions P may be fitted to the pinion shaft PS directly as shown in the illustrated example, or with bearing means (not illustrated), such as a bearing bush and the like, interposed between the pinion shaft PS and each pinion P. Furthermore, the pinion shaft PS may be formed in a shape of a shaft whose diameter is equal throughout its whole length as shown in the illustrated example, or formed in a shape of a stepped shaft.

The differential case DC is rotatably supported by the transmission case 1 with left and right bearings 2 interposed therebetween. Moreover, through-holes 1a through which to insert the output shafts A are formed in the transmission case 1. Annular seal members 3 for sealing interstices between inner peripheries of the through-holes 1a and outer peripheries of the output shafts A are interposed between the inner peripheries and the outer peripheries. Furthermore, an oil pan (not illustrated) facing an inner space of the transmission case 1 and reserving a predetermined amount of lubricant oil is provided in a bottom portion of the transmission case 1. Mechanical interlocking sections existing inside and outside the differential case DC can be lubricated with the lubricant oil which is scattered around the differential device D by rotation of the differential case DC and the other rotary members.

An input toothing portion Ig as a final driven gear is provided in an outer peripheral portion of the input member I. This input toothing portion Ig is in mesh with a drive gear (not illustrated) which is rotationally driven by power of the engine. Incidentally, in the embodiment, the input toothing portion Ig is directly formed in an outer peripheral surface of the input member I over a full lateral width of the input member I (i.e., an overall axial width of the input member I). Instead, however, the input toothing portion Ig may be formed to have the width smaller than that of the input member I. Otherwise, the input toothing portion Ig may be formed separately from the input member I, and thereafter fixed to the outer peripheral portion of the input member I.

Meanwhile, in the embodiment, the pinions P and the side gears S are each formed as a bevel gear. In addition, each pinion P as a whole and each side gear S as a whole, including their toothing portions, are formed by plastic working such as forging and the like. For these reasons, their toothing portions with an arbitrary gear ratio can be precisely formed without restriction in machining work in the case where the toothing portions of the pinions P and the side gears S are formed by cutting work. Incidentally, other types of gears may be used instead of the bevel gear. For example, a face gear may be used for the side gears S, while a spur gear or a helical gear may be used for the pinions P.

In addition, the pair of side gears S each include: a cylindrical shaft portion Sj to which an inner end portion of the corresponding one of the pair of output shafts A is connected by being spline-fitted as at 4; an annular toothing portion Sg situated at a position separated outward from the shaft portion Sj in a radial direction of the input member I, and being in mesh with the corresponding pinion P; and an intermediate wall portion Sw formed in a flat ring plate shape orthogonal to the axis L of the corresponding output shaft A, and integrally joining the shaft portion Sj and the toothing portion Sg.

The intermediate wall portion Sw is formed with its width t1 in the radial direction larger than a maximum diameter d1 of the pinion P, and with its maximum thickness t2 in an axial direction of the output shaft A smaller than an effective diameter d2 of the pinion shaft PS (see FIG. 1). Thereby, as described later, a diameter of the side gear S can be made large enough to set the number Ns of teeth of the side gear S sufficiently larger than the number Np of teeth of the pinions P, and the side gear S can be sufficiently thinned in the axial direction of the output shaft A.

Moreover, the cover portion C, which is one of the pair of cover portions C, C', is formed separately from the input member I, and is detachably connected to the input member I using bolts b. The connecting method may use various connecting means other than screw means. Examples of the various connecting means include welding means and swaging means. Meanwhile, the other cover portion C' is formed integral with the input member I. Incidentally, like the one cover portion C, the other cover portion C' may be formed separately from the input member I, and connected to the input member I using bolts b or other connecting means.

Besides, each of the cover portions C, C' includes: a cylindrical boss portion Cb which concentrically surrounds the shaft portion Sj of the side gear S and in which the shaft portion Sj is rotatably fitted and supported; and a plate-shaped side wall portion Cs having an outer side surface which is a flat surface orthogonal to the rotation axis L of the input member I, the side wall portion Cs integrally connected to an inner end in an axial direction of the boss portion Cb. The side wall portions Cs of the cover portions C, C' are disposed within the width of the input member I (accordingly, the input toothing portion Ig) in the axial direction of the output shaft A. This inhibits the side wall portions Cs of the cover portions C, C' from protruding outward from an end surface of the input member I in the direction of the rotational axis, and is thus advantageous in making a width of the differential device D narrower in the axial direction of the output shaft.

In addition, by inner side surfaces of the side wall portions Cs of the cover portions C, C', back surfaces of at least one of the intermediate wall portions Sw and the toothing portions Sg of the side gears S are rotatably supported via washers W, respectively. Incidentally, such washers W may be omitted so that by the inner side surfaces of the side wall portions Cs, the back surfaces of at least one of the intermediate wall portions Sw and the toothing portions Sg of the side gears S are rotatably and directly supported, respectively. Furthermore, the shaft portions Sj of the side gears S may be supported by the boss portions Cb of the cover portions C, C' via bearings, respectively.

Meanwhile, the input member I surrounds an entire periphery of each side gear S with an inner peripheral surface Ii of the input member I being close to an outer peripheral portions of the side gear S. Furthermore, as also shown in FIG. 2, among the inner peripheral surface Ii of the input member I, particularly a predetermined inner peripheral part Iia situated around each pinion P is formed in a recessed shape so as to be separated farther from the rotation axis L of the input member I than the other inner peripheral parts, and thus forms an oil reservoir. For this reason, the oil reservoir can effectively collect and reserve the lubricant oil due to centrifugal force produced by rotation of the input member I, and a large amount of lubricant oil collected there can be efficiently supplied to the corresponding pinion P and its vicinity. Accordingly, even under severe driving conditions and the like, such as high-speed rotation of the pinions P, the lubricant oil can be sufficiently supplied to sliding portions of the pinions P and meshing portions of the pinions P and the side gears S. This is effective to prevent seizure in the sliding portions and the mesh portions.

In the differential device D of the embodiment in particular, as described above, the diameter of the side gears S (accordingly, the differential case DC) can be made large enough and the larger amount of lubricant oil can be efficiently collected into the predetermined inner peripheral parts Iia (the oil reservoirs) in the input member I using the larger centrifugal force. For this reason, even though the larger diameter of the side gears S makes the pinions P rotate at faster speed, an obvious seizure preventing effect can be obtained.

In the embodiment, the predetermined inner peripheral parts Iia serving as the oil reservoirs are each formed in a shape of an arc, whose curvature is larger than that of the other inner peripheral parts on a cross-section orthogonal to the rotation axis L of the input member I. In addition, in the embodiment (FIG. 2), the predetermined inner peripheral parts Iia are each formed as a first arc with a relatively small diameter, whose center O' is offset from the rotation axis L of the input member I toward the corresponding pinion P on the cross-section; and the other inner peripheral parts are each formed as a second arc with a diameter larger than that of the first arc, whose center O is situated on the rotation axis L of the input member I on the cross-section. Thereby, even when the predetermined inner peripheral parts Iia (the oil reservoirs) are set in relatively narrow areas in a peripheral direction, the predetermined inner peripheral parts Iia can be formed deeply enough on sides separating from the rotation axis L of the input member I. For this reason, the lubricant oil can be sufficiently retained there. Moreover, because the predetermined inner peripheral parts Iia can be easily machined in the inner peripheral surface Ii of the input member I even using a general-purpose machine such as a lathe and the like, cost reduction can be achieved.

Meanwhile, FIGS. 3A and 3B show modified embodiments of the inner peripheral shape of the input member I. Specifically, in FIG. 3A, the inner peripheral surface Ii of the input member I is formed by joining multiple (two in the illustrated example) arcs with the same diameter whose centers O" are offset from the rotation axis L of the input member I toward the corresponding pinions P on the cross-section orthogonal to the rotation axis L of the input member I, while a central part of each arc in the peripheral direction serves as the predetermined inner peripheral part Iia. The inner peripheral shape of the input member I makes it possible to easily machine the predetermined inner peripheral parts Iia (the oil reservoirs) in the inner peripheral surface Ii of the input member I even using the general-purpose machine such as the lathe and the like. In addition, since the diameters of the multiple arcs are equal to one another, a machining tool such as a drill and the like for forming an arc surface can be used commonly for the arcs. For these reasons, further cost reduction can be achieved.

Moreover, in FIG. 3B, the inner peripheral surface Ii of the input member I is formed in a shape of an ellipse whose major axis coincides with an axis of the pinion shaft PS on the cross-section orthogonal to the rotation axis L of the input member I, while each end portion of the ellipse on the major axis side serves as the predetermined inner peripheral part Iia.

It should be noted that in addition to the embodiment shown in FIGS. 2, 3A and 3B, various modified embodiments can be created for the inner peripheral shape of the input member I. For example, on the cross-section, the inner peripheral shape of the input member I may be formed in an oval shape (not illustrated) which is formed by joining a pair of semicircles and a pair of short straight lines. In this case, a central part of each semicircle in the peripheral direction serves as the predetermined inner peripheral part Iia. Moreover, although in the embodiment, the predetermined inner peripheral parts Iia and the other inner peripheral parts are smoothly connected to each other, steps may be formed between the predetermined inner peripheral parts Iia and the other inner peripheral parts.

Next, descriptions will be provided for a structure for attaching the pinion shaft PS, as the pinion support portion, to the input member I. The pinion shaft PS has both end portions which are connected to and supported by the input member I via attachment bodies T. A retaining hole Th is formed in each attachment body T (see FIG. 1), the retaining hole Th being able to be fitted therein with and retain an entire periphery of the corresponding end portion of the pinion shaft PS. Furthermore, attachment grooves Ia each having a cross section with an angular U-shape are provided in the inner peripheral surface Ii of the input member I, each of the attachment grooves Ia having an opening in a side surface of the input member I on the one cover portion C side and extending in the axial direction of the output shafts A. Each attachment body T having a rectangular parallel-epiped shape is inserted into the corresponding attachment groove Ia from the opening. The attachment body T is fixed to the input member I by fastening the one cover portion C to the input member I using the bolts b, with the attachment body T inserted in the attachment groove Ia of the input member I.

The above-described structure for attaching the pinion shaft PS to the input member I enables the pinion shaft PS to be easily and firmly connected and fixed to the attachment grooves Ia in the input member I by use of the block-shaped attachment bodies T in which the entire peripheries of the end portions of the pinion shaft PS are fitted and retained. For this reason, the pinion shaft PS can be connected to and supported by the input member I with high strength, with no specialized through-hole for supporting the pinion shaft PS formed in the input member I, and without decreasing assembly workability. Furthermore, the embodiment achieves structure simplification since the cover portion C covering the outer side of the corresponding side gear S concurrently serves as the fixing means for retaining the attachment body T.

Thereby, when the both end portions of the pinion shaft PS are connected to and supported by the input member I via the attachment bodies T, clearances 10 in the radial direction of the input member I are formed between outer end surfaces of the pinions P rotatably supported by the pinion shaft PS (i.e., end surfaces of the pinions P which are located outward in the radial direction of the input member I) and the inner peripheral surface Ii of the input member I (i.e., the predetermined inner peripheral parts Iia). This makes it easy for the lubricant oil to be reserved in the clearances 10, and is accordingly effective to prevent seizure in end portions of the pinions P facing the clearances 10, and their vicinities.

Meanwhile, the side wall portion Cs of the one cover portion C has a structure having oil retaining portions 7 covering parts of an axially outer surface of the side gear S in first predetermined areas of the side wall portion Cs. The oil-retaining portions 7 are generally solid panel portions including areas which entirely overlap the pinions P as seen in a side view from outside in the axial direction of the output shaft A (i.e., as seen in FIG. 2). The side wall portion Cs of the one cover portion C also includes lightening portions 8 (also referred to as "weight-reducing portions" or "cutout portions") exposing parts of the axially outer surface of the side gear S to the outside of the differential case DC in second predetermined areas which do not overlap the pinions P as seen in the side view, and connecting arm portions 9 being separated from the oil retaining portions 7 in the peripheral direction of the input member I and extending in the radial direction of the input member I to connect the boss portion Cb and the input member I. In other words, the side wall portion Cs basically having a disk shape in the cover portion C has a structural form in which: the multiple lightening portions 8 each having a cutout shape are formed in the side wall portion Cs at intervals in the peripheral direction; and thereby, one oil retaining portion 7 and one connecting arm portion 9 are formed respectively on opposite sides of the lightening portion 8 in the peripheral direction.

Furthermore, in the embodiment, the lightening portions 8 are each formed in a shape of a cutout which is opened on an outer peripheral end side of the side wall portion Cs and extends substantially along a direction orthogonal to the pinion shaft PS as seen in the side view. Thereby, the oil retaining portions 7 adjacent to the lightening portions 8 are formed as long in the peripheral direction as possible. This enhances an oil retaining effect to be exhibited by the oil retaining portions 7, which will be described next.

The structural form of the side wall portion Cs of the cover portion C, particularly the oil retaining portions 7, makes it possible for the lubricant oil, which tends to move outward in the radial direction due to the centrifugal force produced by the rotation of the input member I, to be easily retained around the pinions P and their vicinities. For this reason, in combination with the above-discussed oil concentrated reserving effect by the predetermined inner peripheral parts Iia (the oil reservoirs) of the input member I using the centrifugal force, it is possible to more efficiently supply the lubricant oil to the pinions P and their vicinities. Accordingly, even under severe driving conditions and the like, such as the high-speed rotation of the pinions P, the lubricant oil can be more efficiently supplied to the sliding portions of the pinions P, as well as the meshing portions of the pinions P and the side gears S; and the seizure in the sliding portions and the meshing portions can be prevented more effectively.

In addition, since the cover portion C includes the lightening portions 8, the lubricant oil can be distributed to the inside and outside of the differential case DC via the lightening portions 8. Thus, the lubricant oil is changed and cooled appropriately, thereby effectively preventing degradation of the lubricant oil. Furthermore, since a large amount of lubricant oil need not be confined inside the differential case DC, and since the cover portion C itself is reduced in weight by an amount of the forming of the lightening portions 8, reduction in the weight of the differential device D can be accordingly achieved.

It should be noted that although in the embodiment, the lightening portions 8 are each formed in the cutout shape which is opened on the outer peripheral end side of the side wall portion Cs, the lightening portions 8 may be instead each formed in a through-hole shape which is not opened on the outer peripheral end side thereof. Furthermore, it should be noted that although in the embodiment, the lightening portions 8 are formed only in the side wall portion Cs of the one cover portion C and the side wall portion Cs of the other cover portion C' is formed in a disk shape with no lightening portion (accordingly, covering entirely the back surfaces of the intermediate wall portion Sw and the toothing portion Sg of the corresponding side gear S), the lightening portions 8 may be formed in the side wall portion Cs of the other cover portion C' as well. In this case, the oil retaining portions 7 and the connecting arm portions 9 are integrally formed in the input member I.

Meanwhile, like the connecting arm portions 9, the oil retaining portions 7 of the embodiment each extend between, and connect, the boss portion Cb of the cover portion C and the input member I. In addition, connecting of the cover portion C to the input member I by the oil retaining portions 7 makes it easier for the lubricant oil, which tends to move outward in the radial direction due to the centrifugal force during the rotation of the input member I, to stay in spaces covered by the oil retaining portions 7 and the input member I. This makes it easy for the lubricant oil to be retained around the pinions P and their vicinities.

It should be noted that the structure for connecting the oil retaining portions 7 and the connecting arm portions 9 to the input member I has been described as the structure for connecting the cover portion C to the input member I. In other words, the oil retaining portions 7 and the connecting arm portions 9 may be formed integral with the input member I. Otherwise, in a case where the oil retaining portions 7 and the connecting arm portions 9 are formed separately from the input member I, the oil retaining portions 7 and the connecting arm portions 9 are connected to the input member I using the screw means such as the bolts b and the like, or other various connecting means (for example, welding means, swaging means and the like).

Furthermore, since the cover portion C has the structure in which the cover portion C integrally include the connecting arm portions 9 that connect the boss portion Cb and the input member I in addition to the oil retaining portions 7, the embodiment can accordingly increase: connecting strength with which the cover portion C is connected to the input member I; rigidity strength of the cover portion C itself which supports the back surface of the corresponding side gear S; and support rigidity with which the cover portion C supports the side gear S. Incidentally, the connecting arm portions 9 are not essential for the cover portion C, and another embodiment in which the connecting arm portions 9 are removed from the cover portion C may be carried out. Furthermore, in a case where the cover portion C particularly includes the connecting arm portions 9, another embodiment in which the oil retaining portions 7 are not connected to the input member I may be carried out.

Besides, the cover portion C of the embodiment has an oil guiding inclined surface f in a peripheral edge portion of each lightening portion 8, the oil guiding inclined surface f being capable of guiding flow of the lubricant oil into an inner side of the input member I during the rotation of the input member I. As seen in a cross-section crossing the oil retaining portions 7 and the connecting arm portions 9 in the peripheral direction of the input member I (see the partially cutaway sectional view in FIG. 2), the oil guiding inclined surface f is formed so as to be inclined to the respective center sides in the peripheral direction of the oil retaining portion 7 and the connecting arm portion 9, toward their respective inner side surfaces from their respective outer side surfaces. Thus, the oil guiding inclined surface f makes it possible for the lubricant oil to smoothly flow from the outer side to the inner side of the cover portion C, and accordingly enhances the effect of lubricating the pinions P and the like.

Figure 4:
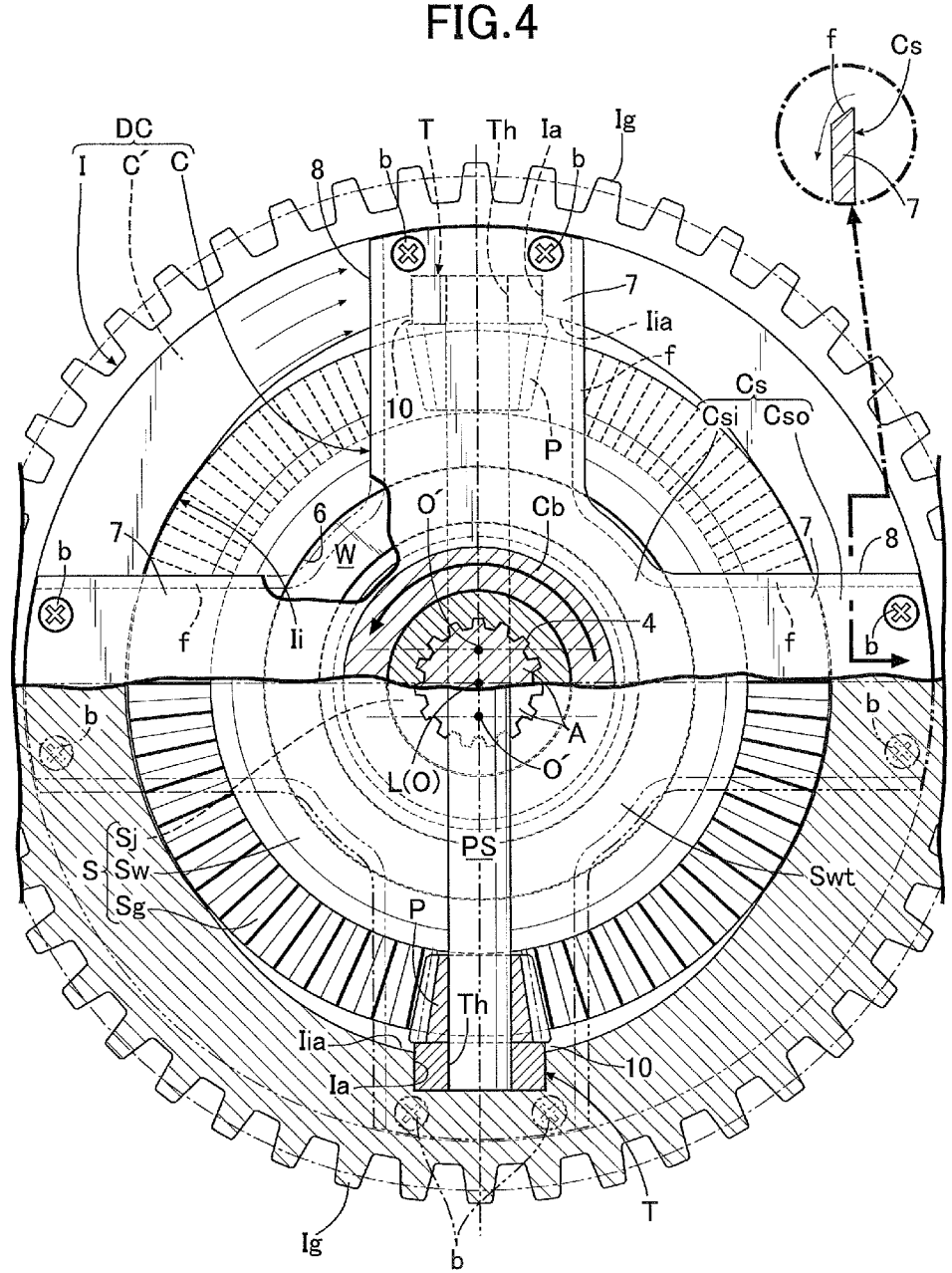
FIG. 4 is a side view showing a modified embodiment of a cover portion of the differential device, and corresponding to FIG. 2.

Moreover, various modified embodiments can be created for the form of the lightening portions 8 (accordingly, the oil retaining portions 7 and the connecting arm portions 9) of the cover portion C, and the form of the lightening portions 8 is not limited to the embodiment shown in FIG. 2. For example, in a modified embodiment shown in FIG. 4, each lightening portion 8 is formed in a shape of a fan whose center angle is substantially 90 degrees in a way that the oil retaining portions 7 and the connecting arm portions 9 extend radially (in other words, the oil retaining portions 7 and the connecting arm portions 9 have a cross shape as a whole).

Figure 10:
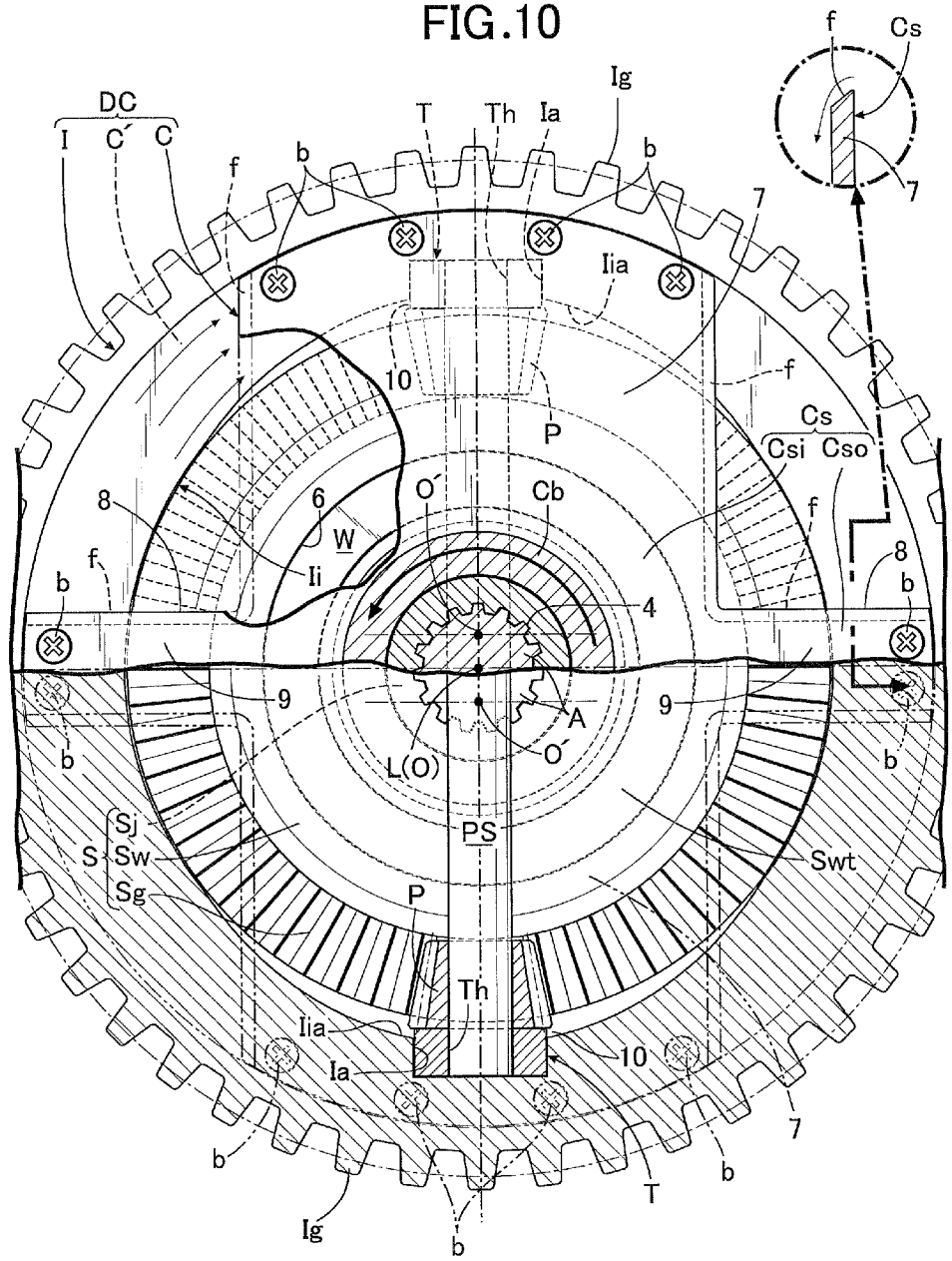
FIG. 10 is a side view showing another modified embodiment of the cover portion in the differential device, and corresponding to FIGS. 2 and 4.

Moreover, FIG. 10 shows another modified embodiment of the cover portion C. In this modified embodiment, the cover portion C includes: the oil retaining portions 7, each of which as a whole is formed uniformly wide in the peripheral direction of the input member I so as to cover a wide region of the back surface of the side gear S in an area overlapping the corresponding pinion P and in its vicinity as seen in the side view from outside in the axial direction of the output shaft A (i.e., as seen in the same direction as FIGS. 2 and 4); and the connecting arm portions 9 which extend outward from both side portions of the oil retaining portions 7 in the radial direction of the input member I and connected to the input member I, and which is narrow in width in the peripheral direction. In this modified embodiment, the sufficient lightening portions 8 are formed between the connecting arm portions 9 and the oil retaining portions 7 by forming the connecting arm portions 9 with a minimum width necessary for securing strength of the connecting arm portions 9. In other words, in this modified embodiment, the cover portion C includes: the oil retaining portions 7 each covering the wide region of the back surface of the side gear S in the area overlapping the pinion P and in its vicinity, that is, in the first predetermined area, as seen in the side view from outside in the axial direction of the output shaft A (i.e., as seen in the same direction as FIGS. 2 and 4); and the lightening portions 8 each provided between the oil retaining portion 7 and the connecting arm portion 9 and each exposing the back surface of the side gear S to the outside of the differential case DC in the second predetermined area not overlapping the pinion P, as seen in the side view. This configuration of the cover portion C makes it possible for the lubricant oil to be more easily retained around the pinions P and their vicinities. Accordingly, even under severe driving conditions and the like, such as high-speed rotation of the pinions P, the weight of the differential device D can be further reduced while more effectively preventing the seizure in the sliding portions of the pinions P and the meshing portions of the pinions P and the side gears S.

Meanwhile, in each side gear S, at least part (in the embodiment, all) of the intermediate wall portion Sw is formed as a thin portion Swt whose outer side surface retreats inward from the back surface of the toothing portion Sg in the axial direction of the output shaft A (see FIG. 1). On the other hand, each of the side wall portions Cs of the cover portions C, C' (particularly, the oil retaining portions 7 and the connecting arm portions 9 in the side wall portion Cs of the cover portion C) integrally includes: an outer periphery-side side wall portion Cso whose inner side surface faces the back surface of the toothing portion Sg of the side gear S; and an inner periphery-side side wall portion Csi whose inner side surface faces the back surface of the intermediate wall portion Sw of the side gear S. Furthermore, at least part (in the embodiment, all) of the inner periphery-side side wall portion Csi is formed thicker in a direction along the rotation axis than the outer periphery-side side wall portion Cso, and protrudes toward the thin portion Swt.

Because of these structures, in each of the side gears S, at least part of the intermediate wall portion Sw, which does not need so much rigidity as the toothing portion Sg, can be formed as the thin portion Swt retreating inward in the axial direction from the back surface of the toothing portion Sg; in each of the cover portions C, C', each of the inner periphery-side side wall portions Csi of the cover portions C, C' corresponding to the thin portion Swt can be made thicker without being protruded outward in the axial direction; and the support rigidity with which the cover portion C supports the thin intermediate wall portion Sw of the side gear S can be sufficiently increased. This is extremely advantageous in sufficiently narrowing the width of the differential device D in the axial direction of the output shafts A while securing the rigidity strength of each side gear S and the differential case DC.

Moreover, as described above, the washers W relatively rotatably connecting the side gears S and the cover portions C, C' are interposed between mutually-facing surfaces of the back surfaces of the side gears S and the side wall portions Cs of the cover portions C, C', respectively. In the embodiment, washer retaining grooves 6 for retaining the washers W at their fixed positions are formed in back surfaces of the thin portions Swt of the side gears S, respectively. Thereby, the thin portions Swt with relatively low rigidity in the side gears S can be directly supported by the washers W, and support strength with respect to the thin portions Swt can be increased. Furthermore, since the washers W are housed in and retained by the washer retaining grooves 6, increase in the dimension of the differential device D in the axial direction due to the thicknesses of the washers W can be inhibited.

Figure 5A:
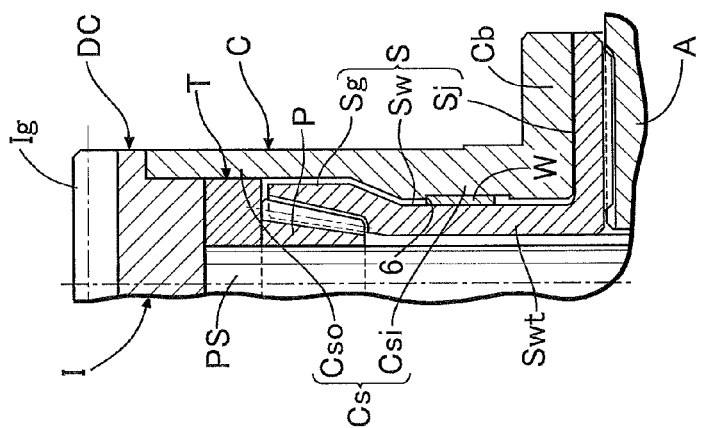
FIGS. 5A to 5D show other modified embodiments of the differential device.
Figure 5B:
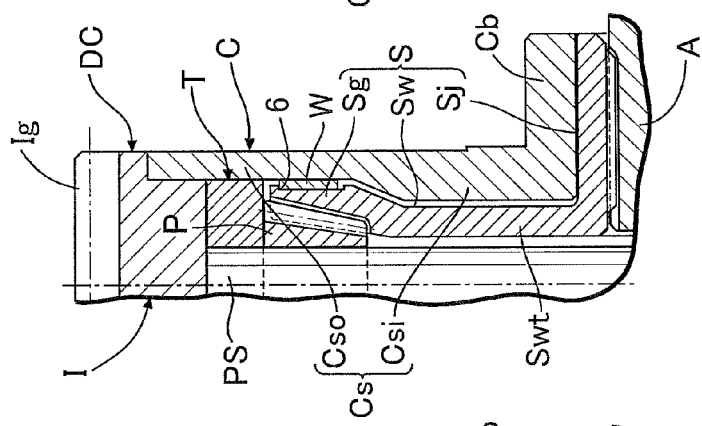

Meanwhile, various modified embodiments can be created for a mode of setting the washers W to be interposed between the mutually-facing surfaces of the back surfaces of the side gears S and the side wall portions Cs of the cover portions C, C'. For example, in FIG. 5A, the washer retaining groove 6 is formed in an inner side surface of each of the cover portions C, C' which faces the thin portion Swt of the corresponding side gear S, and the washer W is retained by the thus-formed washer retaining groove 6. This avoids that the thin portion Swt is further thinned due to the washer retaining groove 6. In addition, in FIG. 5B, the washer retaining groove 6 is formed in the back surface of the toothing portion Sg of the side gear S, and the washer W is retained by the thus-formed washer retaining groove 6. This shifts a load supporting point with respect to the side gear S further outward in the radial direction (accordingly, to a position close to a meshing portion of the side gear S and the pinion P), and thereby increases the supporting strength.

Figure 5C:
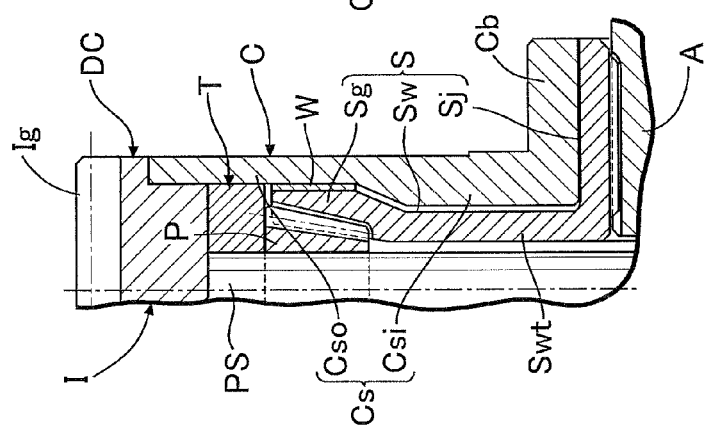

Furthermore, in FIG. 5C, a position of an inner periphery of the washer W is made to coincide with a start position at which the side wall portion Cs of each of the cover portions C, C' starts to protrude inward in the axial direction. Thereby, the mode of such inward protrusion of the side wall portion Cs is used to position the washer W. This makes it possible to position and retain the washer W even though no washer retaining groove 6 is provided, and decrease in the strength due to forming of the washer retaining groove is avoided.

Figure 5D:
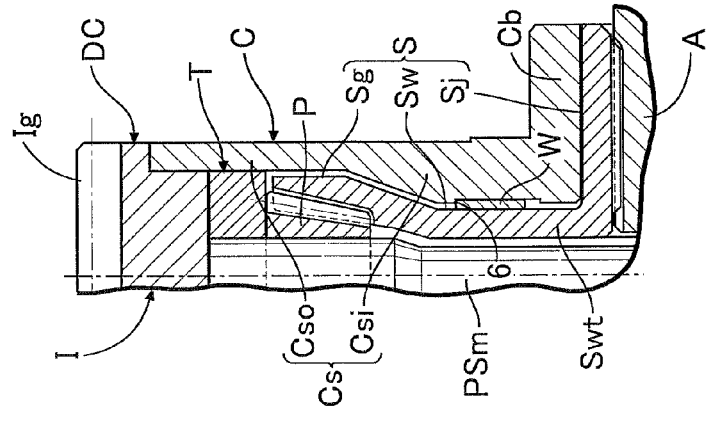

Moreover, in FIG. 5D, of the pinion shaft PS having a linear rod shape extending in the radial direction (along the one diameter line) from the rotation axis of the input member I, an intermediate shaft portion PSm facing the thin portion Swt of each side gear S is formed with a smaller diameter than that of another shaft portion of the pinion shaft PS. Thereby, the thin portion Swt is retreated and shifted inward in the axial direction by the decrease in the diameter of the intermediate shaft portion PSm like this, and the side wall portion Cs (particularly, the inner periphery-side side wall portion Csi) of each of the cover portions C, C' is made much thicker corresponding to such retreating shift so as to increase the support rigidity with respect to the corresponding side gear S.

Since as described above, each side gear S includes the intermediate wall portion Sw which is relatively wide in the radial direction, a torque transmission passage from the toothing portion Sg of side gear S to the corresponding output shaft A becomes longer in the radial direction so that the gear supporting strength may undesirably be decreased. In the embodiment, however, the washer W can be properly disposed and fixed at an appropriate radial position (see FIGS. 1 and 5A to 5D) considered the gear supporting strength along the torque transmission passage. For this reason, the embodiment can effectively inhibit the decrease in the gear supporting strength.

Next, descriptions will be provided for an operation of the embodiment. In the differential device D of the embodiment, in a case where the input member I receives rotational force from a power source, when together with the input member I, the pinion P revolves around the axis L of the input member I without rotating around the pinion shaft PS, the left and right side gears S are rotationally driven at the same speed, and their driving forces are evenly transmitted to the left and right output shafts A. Meanwhile, when a difference in rotational speed occurs between the left and right output shafts A due to turn traveling or the like of the automobile, the pinion P revolves around the axis L of the input member I while rotating around the pinion shaft PS. Thereby, the rotational driving force is transmitted from the pinion P to the left and right side gears S while allowing differential rotations. The above is the same as the operation of the conventional differential device.

Next, referring to FIGS. 6A to 6D, descriptions will be provided for steps of manufacturing and assembling the differential device D of the embodiment. The steps include at least steps [1] to [6] as follows.

[1] A step of manufacturing preparing a differential case main body DC', the cover portion C, the side gears S, the pinions P, the pinion shaft PS, and the attachment bodies T, in their respective separate steps, the differential case main body DC' being obtained by integrally forming the input member I and the cover portion C' (or by connecting the input member I and the cover portion C' which are manufactured separately).

Figure 6A:
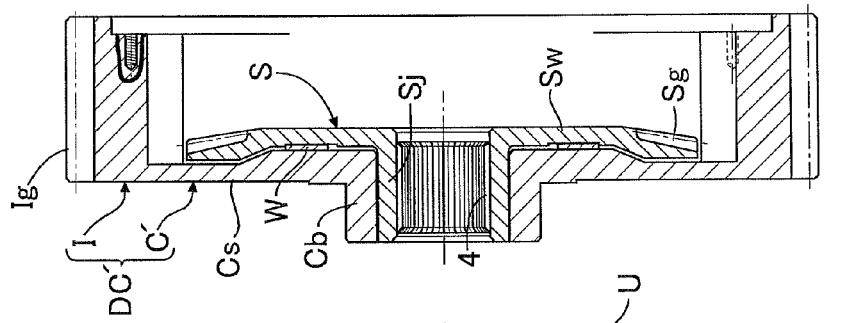
FIGS. 6A to 6D are step explanatory views showing an example of a step for assembling the differential device.

[2] A step of fitting one side gear S into the differential case main body DC' as shown in FIG. 6A.

Figure 6B:
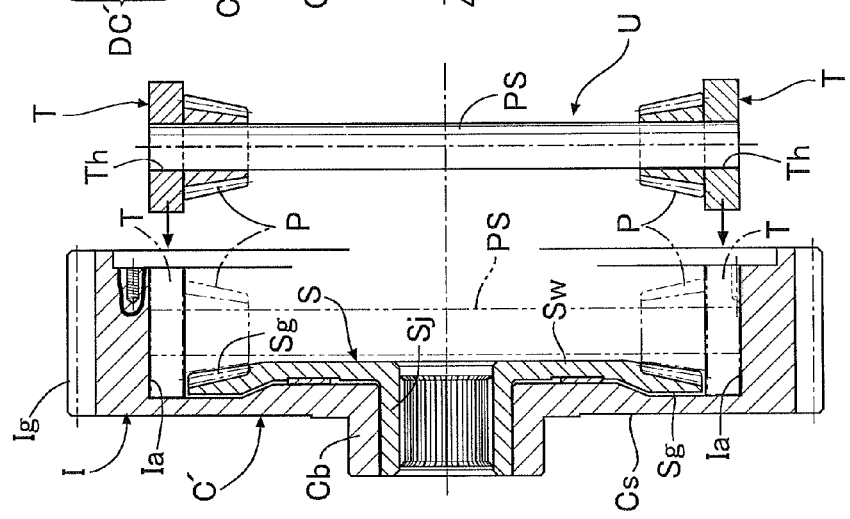

[3] An assembly step of, as shown by solid lines in FIG. 6B, assembling an attachment unit U such that the both end portions of the pinion shaft PS are fitted and supported in center holes of the pinions P and the retaining holes Th of the attachment bodies T, and temporarily keeping the assembled state using a jig (not illustrated).

[4] A step of, as shown by arrows and chain double-dashed lines in FIG. 6B, fitting the attachment unit U into the differential case main body DC' so as to insert the attachment bodies T into the attachment grooves Ia of the input member I and so as to mesh the pinions P with the toothing portion Sg of the one side gear S, thereby detaching the attachment unit U from the jig, and therefore temporarily fixing and retaining the attachment unit U to the input member I.

Figure 6C:
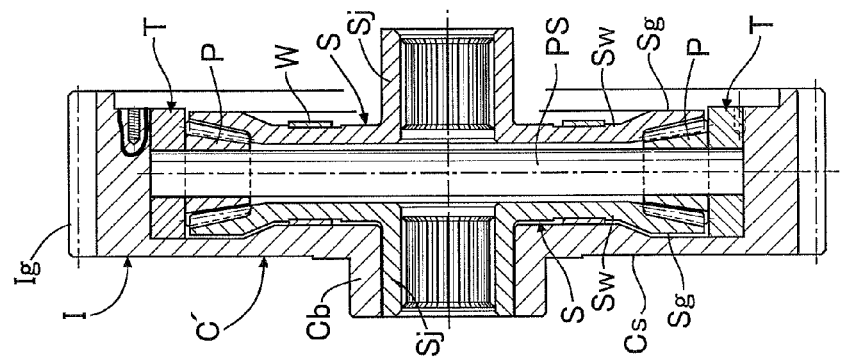

[5] A step of, as shown in FIG. 6C, overlapping the other side gear S on an outside of the attachment unit U temporarily fixed and retained to the input member I, and meshing the pinions P with the toothing portion Sg of the other side gear S.

Figure 6D:
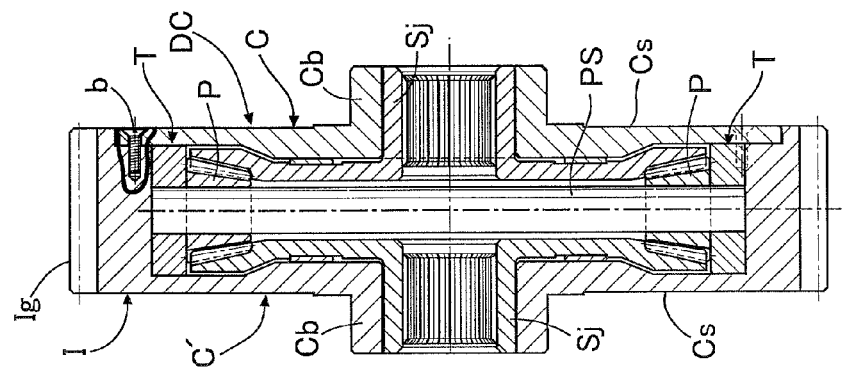

[6] A step of, as shown in FIG. 6D, overlapping the cover portion C on the back surface side of the other side gear S and fastening the cover portion C to the input member I with the bolts b, thereby clamping and fixing the attachment bodies T of the attachment unit U between the cover portion C and inner surfaces of the attachment grooves Ia of the input member I, thus completing the differential device D.

In the series of steps, particularly in the assembly step [3], the attachment unit U is assembled and fixed to the input member I by: assembling the attachment unit U as a subassembly in advance, the attachment unit U being obtained by unitizing the pinion shaft PS, the pinions P and the attachment bodies T; thereafter positioning and retaining the attachment unit U in the input member I by inserting the attachment bodies T into the attachment grooves Ia of the input member I; and thereafter fastening the cover portion C to the input member I. For this reason, assembly work efficiency can be effectively enhanced.

In addition, in the differential device D assembled as described above, each side gear S includes: the shaft portion Sj connected to the output shaft A; and the intermediate wall portion Sw formed in a flat ring plate shape orthogonal to the axis L of the output shaft A, and integrally connecting the shaft portion Sj and the side gear toothing portion Sg which is separated outward from the shaft portion Sj in the radial direction of the input member I. Furthermore, in each side gear S, the intermediate wall portion Sw is formed in the way that its width t1 in the radial direction is longer than a maximum diameter d1 of each pinion P. For these reasons, relative to the pinions P, the diameter of the side gear S can be made large enough to set the number Ns of teeth of the side gear S sufficiently larger than the number Np of teeth of the pinions P. This makes it possible to reduce load burden to the pinion shaft PS while the torque is being transmitted from the pinions P to the side gears S, and thus to decrease the effective diameter d2 of the pinion shaft PS, accordingly the width of the pinions P in the axial direction of the output shafts A.

In addition, since the load burden to the pinion shaft PS is reduced as describe above, since reaction force applied to each side gear S decreases, and since the back surface of the intermediate wall portion Sw or the toothing portion Sg of the side gear S is supported by the corresponding cover side wall portion Cs, it is easy to secure the rigidity strength needed for the side gear S even though the intermediate wall portion Sw of the side gear S is thinned. That is to say, it is possible to sufficiently thin the side gear intermediate wall portion Sw while securing the support rigidity with respect to the side gear S. Moreover, in the embodiment, since the maximum thickness t2 of the side gear intermediate wall portion Sw is formed much smaller than the effective diameter d2 of the pinion shaft PS whose diameter can be made smaller as described above, the further thinning of the side gear intermediate wall portion Sw can be achieved. Besides, since the cover side wall portion Cs is formed in a plate shape such that the outer side surface thereof is the flat surface orthogonal to the axis L of the corresponding output shaft A, the thinning of the cover side wall portion Cs itself can be achieved.

As a result of these, the width of the differential device D can be sufficiently decreased in the axial direction of the output shafts A as a whole while securing as approximately the same strength (for example, static torsion load strength) and as approximately the same amount of maximum torque transmission compared with the conventional differential device. This makes it possible to easily incorporate the differential device D, with great freedom and without trouble, even when a transmission system imposes many restrictions on the layout of the vicinity of the differential device D, and is extremely advantageous in reducing the size of the transmission system.

Figure 8A:
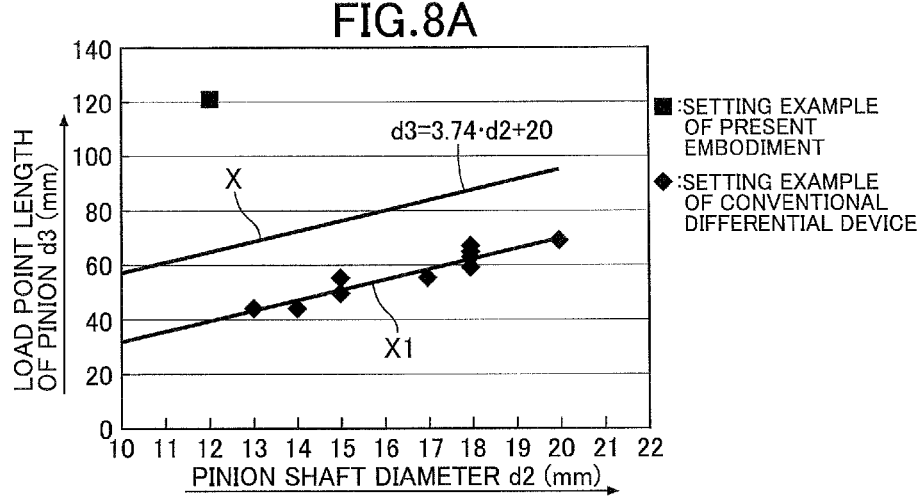
FIGS. 8A to 8C are graphs for comparing a setting example of the differential device of the embodiment and a setting example of a conventional differential device.

In addition, in the embodiment, it is desirable that the side gears S and the pinions P be set to satisfy a relationship expressed with $$d3 \geq 3.74 \cdot d2 + 20 \tag{1}$$

where d2 denotes the effective diameter of the pinion support portion PS, and d3 denotes a load point length of the pinions P (i.e., in an area on and above a line X in FIG. 8A).

In this respect, the load point length d3 of the pinions P is twice as long as the length of the distance from the rotational axis L to a large-diameter end surface of one pinion P. For example, when the pair of pinions P are disposed facing each other, a distance between the large-diameter end surfaces of the pair of pinions P is the load point length d3 (see FIG. 1).

A line X1 shown in FIG. 8A represents a relationship between the pinion shaft diameter d2 and the load point length d3 of the pinions P in the conventional differential device. A predetermined static torsion load strength can be secured by setting the load point length d3 in a way that a relationship of the load point length d3 with the pinion shaft diameter d2 is represented by the line X1. In contrast, in a setting example in the embodiment, the line X whose gradient is equal to that of the line X1 and which makes the load point length d3 sufficiently large is set; and the pinion shaft diameter d2 and the load point length d3 of the pinions P are set in the region on and above the line X. For this reason, in the embodiment, the load point length of the pinions P can be made sufficiently long, and the width of the differential device D can be sufficiently decreased in the axial direction of the output shafts A, while securing the static torsion load strength which is not less than that of the conventional differential device.

Moreover, it is desirable that a pitch cone distance PCD of each pinion P as the bevel gear (i.e., a distance from a center of a fan shape of the pinion P having a longitudinal cross section with the fan shape to an outer end of the pinion P), the number Np of teeth of the pinion P, the number Ns of teeth of each side gear S be set to satisfy relationships expressed with $$Ns/Np \geq 2 \quad (2)$$

$$PCD \geq 6.17 \cdot (Ns/Np) + 20 \quad (3)$$

Figure 8B:
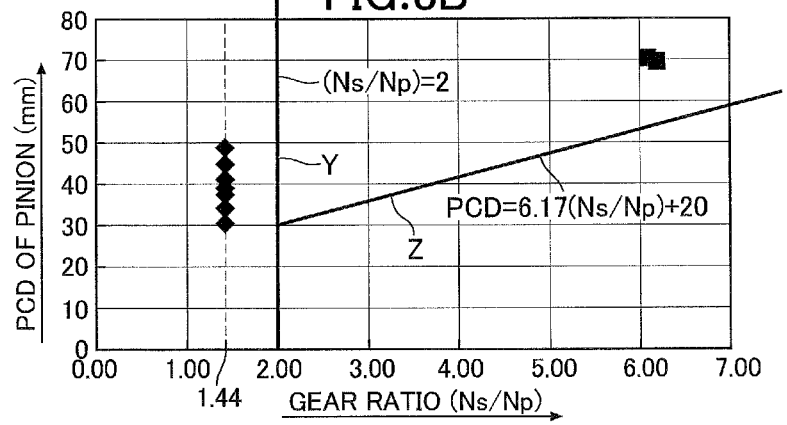
Figure 8C:
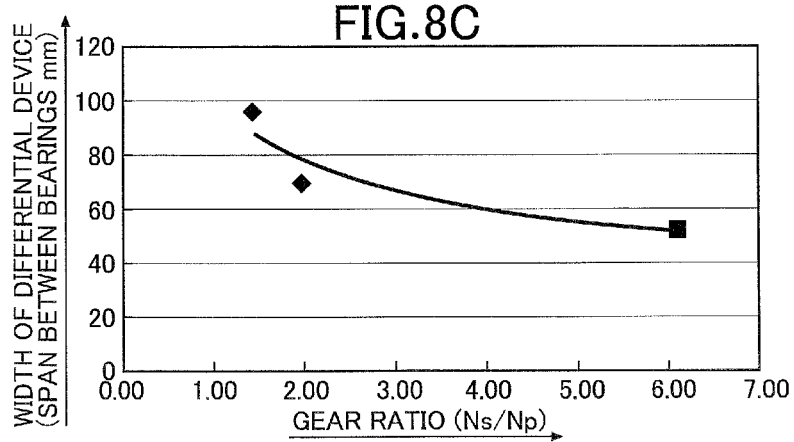

(i.e., in an area in the right of and on a line Y, and on and above a line Z in FIG. 8B). To put it specifically, the line Y in FIG. 8B represents a gear ratio (Ns/Np) for sufficiently decreasing the width of the differential device D in the axial direction of the output shafts A. When the gear ratio (Ns/Np) is set in the right of and on the line Y (i.e., when the gear ratio (Ns/Np) is set at two or greater), the effect of decreasing the width of the differential device D is large as shown in FIG. 8C. Meanwhile, in FIG. 8B, the line Z is a line representing a relationship between the gear ratio and the pitch cone distance for obtaining an amount of torque transmission which is generally considered to be needed for four-wheeled automobiles, and is determined by plotting design values of the conventional differential device. Accordingly, when the relationship between the gear ratio (Ns/Np) and the pitch cone distance of the pinion P is set in a way that the relationship is included in the area in the right of and on the line Y, and on and above the line Z, the width of the differential device D of the embodiment can be sufficiently decreased in the axial direction of the output shafts A (see FIG. 8C) while securing the amount of maximum torque transmission which is not less than that of the conventional differential device.

Figure 7:
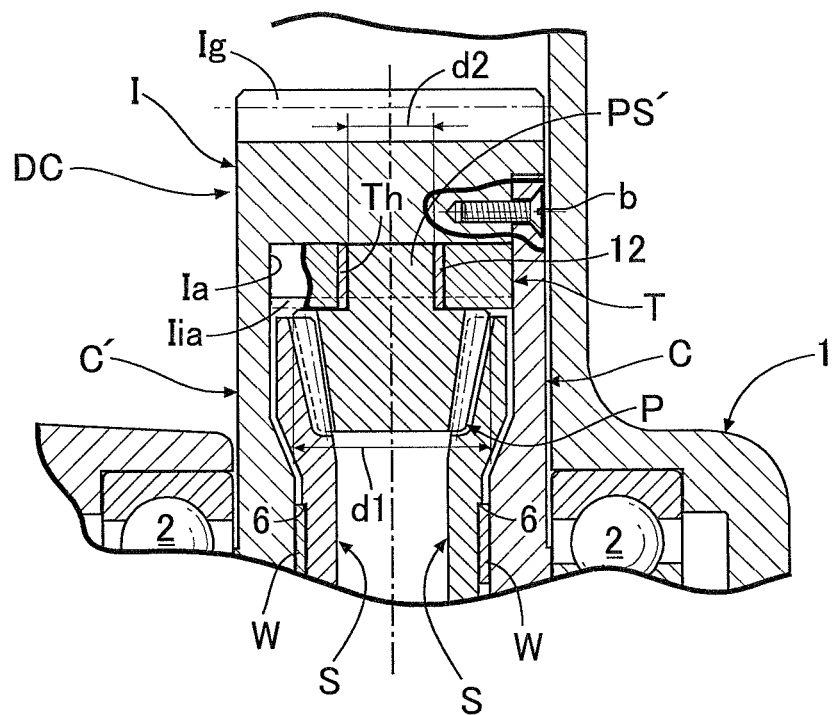
FIG. 7 is a partial sectional view showing a modified embodiment of a pinion support portion in the differential device, and corresponding to FIG. 1.

Meanwhile, although the embodiment where the long pinion shaft PS is used as the pinion support portion has been shown, the pinion support portion may be formed from a support shaft portion PS' coaxially and integrally connected to a large diameter-side end surface of the pinion P as shown in FIG. 7. According to this configuration, because the through-hole into which the pinion shaft PS is fitted need not be provided to the pinion P, the diameter of the pinion P can be accordingly decreased (the width thereof can be decreased in the axial direction), and the differential device D can be flattened in the axial direction of the output shafts A. In other words, when the pinion shaft PS is penetrated through the pinion P, it is necessary to form in the pinion P the through-hole with a size corresponding to the pinion shaft diameter. However, when the support shaft portion PS' is integrated with the end surface of the pinion P, it is possible to decrease the diameter of the pinion P (to decrease the width thereof in the axial direction) without depending on a diameter of the support shaft portion PS'.

Moreover, in the embodiment, a bearing bush 12 as a bearing for allowing relative rotations between the support shaft portion PS' and the attachment body T is inserted between an outer peripheral surface of the support shaft portion PS' and an inner peripheral surface of the retaining hole Th of the corresponding attachment body T into which the support shaft portion PS' is inserted. This bearing bush 12 is inserted between the inner periphery of the retaining hole Th of the attachment body T and the outer periphery of the support shaft portion PS' particularly in the assembly step [3]. This makes it possible to assemble the attachment unit U en masse, including the bearing bush 12, in the assembly step, and to therefore minimize the drop in the assembly work efficiency even though the number of parts increases in response to the addition of the bearing bush 12. Incidentally, the bearing may be formed from a needle bearing or the like. In addition, the bearing may be omitted so that the support shaft portion PS' is directly fitted into the retaining hole Th of the attachment body T.

Although the embodiment of the present invention has been described, the present invention is not limited to the embodiment. Various design changes may be made to the present invention within a scope not departing from the gist of the present invention.

Figure 9:
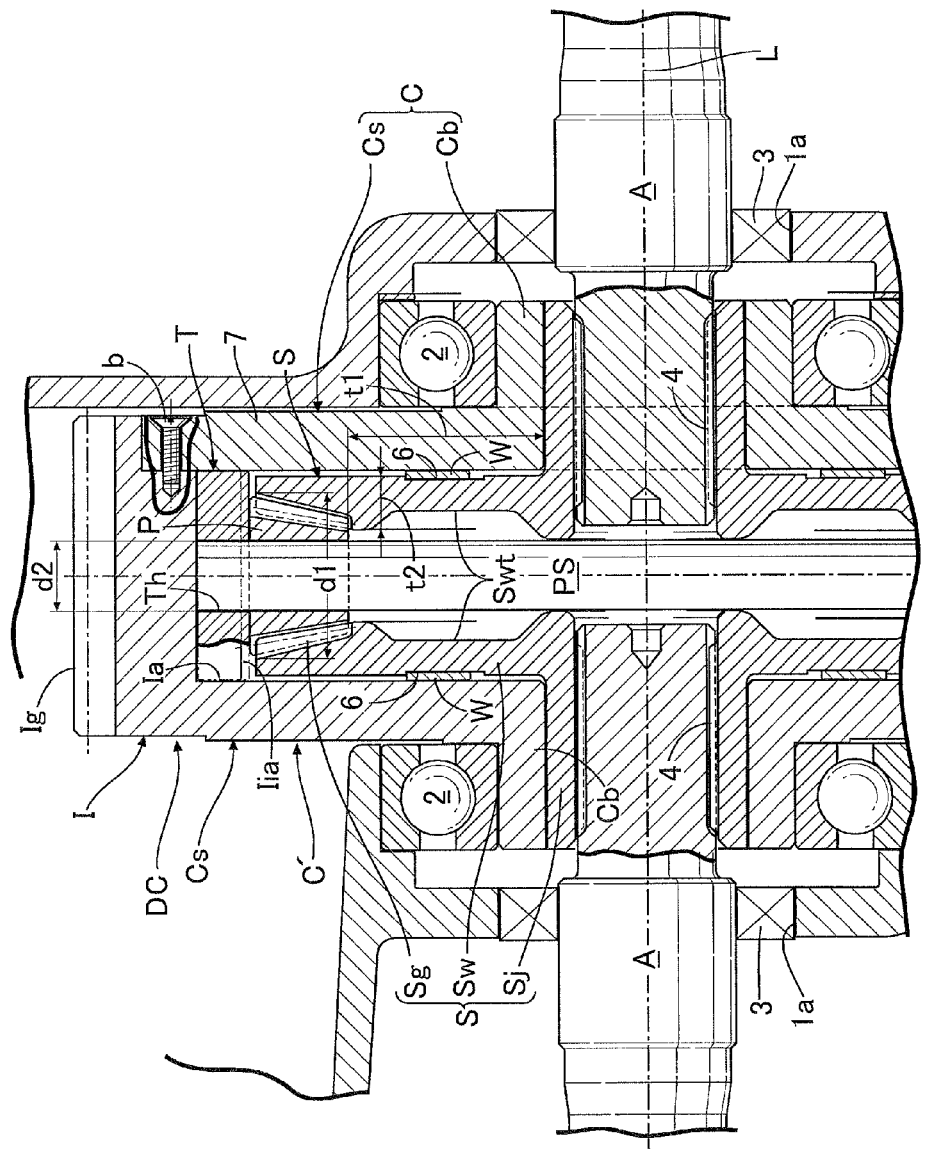
FIG. 9 is a partial sectional view showing a modified embodiment of the side gear and the cover portion in the differential device, and corresponding to FIG. 1.

For example, in any of the embodiments, in each side gear S, the thin portion Swt is formed by making the back surface side of the intermediate wall portion Sw retreat inward in the axial direction of the output shaft A. For example, however, in each side gear S, the back surface side of the intermediate wall portion Sw is formed as a flat surface flush with the back surface of the toothing portion Sg without making the back surface side of the intermediate wall portion Sw retreat inward in the axial direction, as shown in FIG. 9. In this case, the entirety of the inner side surface of the side wall portion Cs of each of the cover portions C, C' is also formed as a flat surface in which the inner periphery-side side wall portion Cso and the outer periphery-side side wall portion Csi are flush with each other.

Furthermore, although the embodiment where the input member I integrally includes the input toothing portion Ig has been shown, a ring gear which is formed separately from the input member I may be fixed to the input member I later instead of the input toothing portion Ig. Moreover, the input member of the present invention may have a structure which includes neither the input toothing portion Ig nor the ring gear. For example, the input member I may be operatively connected to a drive member (for example, an output member of a planetary gear mechanism or a reduction gear mechanism, a driven wheel of an endless transmission belt-type transmission mechanism and the like) situated upstream of the input member I on the power transmission passage so that the rotational driving force is inputted into the input member I.

Moreover, the embodiment where the back surfaces of the pair of side gears S are covered with the pair of cover portions C, C' has been shown, however, in the present invention, the back surface of only one side gear S may be provided with the cover portion. In this case, for example, the upstream-situated drive member may be disposed on the side gear side provided with no cover portion so that the drive member and the input member are operatively connected to each together on the side gear side provided with no cover portion.

What is claimed is:

1. A differential device which distributively transmits rotational force of an input member to a pair of output shafts, the input member retaining a pinion support portion that supports a plurality of pinions thereon, the input member being rotatable together with the pinion support portion, the differential device comprising:
- a pair of side gears each having an outer peripheral portion which includes an annular toothing portion in mesh with the pinions, the side gears connected to the output shafts, respectively; and
- a cover portion covering an outside of at least one side gear of the pair of side gears, and rotating integrally with the input member,
- wherein the cover portion includes:
  - an oil retaining portion covering an axially outer surface of the at least one side gear in a first predetermined area, the oil retaining portion tending to retain oil proximate the pinions, and comprising a solid panel portion which includes areas entirely overlapping and covering all of the pinions as seen in a side view from outside of the cover portion in an axial direction of the output shafts, and
  - a cutout portion exposing the axially outer surface of the at least one side gear to an area outside of the cover portion, the cutout portion forming an opening in a second predetermined area without overlapping any of the pinions as seen in the side view.

2. The differential device according to claim 1, wherein the cover portion is connected to the input member proximate the oil retaining portion.

3. The differential device according to claim 2, wherein the side gears each integrally include a shaft portion connected to a corresponding one of the pair of output shafts, and the cover portion includes
- a boss portion concentrically surrounding the shaft portion of one of the side gears, and
- a connecting arm portion separated from the oil retaining portion in a peripheral direction of the input member, and extending in a radial direction of the input member to connect the boss portion and the input member.

4. The differential device according to claim 3, wherein the cover portion includes an oil guiding inclined surface located in a peripheral edge portion of the cutout portion, the oil guiding inclined surface being capable of guiding flow of lubricant oil into an inside of the input member during rotation of the input member.

5. The differential device according to claim 4, wherein
the cover portion includes a boss portion which surrounds a portion of the at least one side gear connected to the associated output shaft, and a side wall portion which extends from a position around an axial inner end of the at least one side gear to said outer peripheral portion of the at least one side gear, and
the oil retaining portion and the cutout portion are formed in the side wall portion.

6. The differential device according to claim 3, wherein the cover portion includes a side wall portion which extends from a position around an axial inner end of the at least one side gear to said outer peripheral portion of the at least one side gear, and
the oil retaining portion and the cutout portion are formed in the side wall portion.

7. The differential device according to claim 2, wherein the cover portion includes an oil guiding inclined surface located in a peripheral edge portion of the cutout portion, the oil guiding inclined surface being capable of guiding flow of lubricant oil into an inside of the input member during rotation of the input member.

8. The differential device according to claim 7, wherein the cover portion includes a boss portion which surrounds a portion of the at least one side gear connected to the associated output shaft, and a side wall portion which extends from a position around an axial inner end of the at least one side gear to said outer peripheral portion of the at least one side gear, and
the oil retaining portion and the cutout portion are formed in the side wall portion.

9. The differential device according to claim 2, wherein the cover portion includes a boss portion which surrounds a portion of the at least one side gear connected to the associated output shaft, and a side wall portion which extends from a position around an axial inner end of the at least one side gear to said outer peripheral portion of the at least one side gear, and
the oil retaining portion and the cutout portion are formed in the side wall portion.

10. The differential device according to claim 1, wherein the side gears each integrally include a shaft portion connected to a corresponding one of the pair of output shafts, and the cover portion includes
- a boss portion concentrically surrounding the shaft portion of one of the side gears, and
- a connecting arm portion separated from the oil retaining portion in a peripheral direction of the input member, and extending in a radial direction of the input member to connect the boss portion and the input member.

11. The differential device according to claim 10, wherein the cover portion includes an oil guiding inclined surface located in a peripheral edge portion of the cutout portion, the oil guiding inclined surface being capable of guiding flow of lubricant oil into an inside of the input member during rotation of the input member.

12. The differential device according to claim 11, wherein the cover portion includes a boss portion which surrounds a portion of the at least one side gear connected to the associated output shaft, and a side wall portion which extends from a position around an axial inner end of the at least one side gear to said outer peripheral portion of the at least one side gear, and
the oil retaining portion and the cutout portion are formed in the side wall portion.

13. The differential device according to claim 10, wherein the cover portion includes a side wall portion which extends from a position around an axial inner end of the at least one side gear to said outer peripheral portion of the at least one side gear, and
the oil retaining portion and the cutout portion are formed in the side wall portion.

14. The differential device according to claim 1, wherein the cover portion includes an oil guiding inclined surface located in a peripheral edge portion of the cutout portion, the oil guiding inclined surface being capable of guiding flow of lubricant oil into an inside of the input member during rotation of the input member.

15. The differential device according to claim 14, wherein the cover portion includes a boss portion which surrounds a portion of the at least one side gear connected to the associated output shaft, and a side wall portion which extends from a position around an axial inner end of the at least one side gear to said outer peripheral portion of the at least one side gear, and
the oil retaining portion and the cutout portion are formed in the side wall portion.

16. The differential device according to claim 1, wherein
the cover portion includes a boss portion which surrounds a portion of the at least one side gear connected to the associated output shaft, and a side wall portion which extends from a position around an axial inner end of the at least one side gear to said outer peripheral portion of the at least one side gear, and the oil retaining portion and the cutout portion are formed in the side wall portion.

* * * * *